United States Patent [19]

Jacob

[11] Patent Number: 4,701,022

[45] Date of Patent: Oct. 20, 1987

[54] DAY/NIGHT MIRROR

[75] Inventor: Keith D. Jacob, Ann Arbor, Mich.

[73] Assignee: C-D Marketing, Ltd., Ann Arbor, Mich.

[21] Appl. No.: 675,487

[22] Filed: Nov. 28, 1984

[51] Int. Cl.[4] .............................................. G02B 17/00
[52] U.S. Cl. ..................... 350/278; 350/279
[58] Field of Search .................. 350/278, 279, 281

[56] References Cited

U.S. PATENT DOCUMENTS

| 3,601,614 | 8/1971 | Platzer, Jr. | 350/279 |
| 3,612,666 | 10/1971 | Rabinow | 350/281 |
| 4,443,057 | 4/1984 | Bauer et al. | 350/281 |

Primary Examiner—John K. Corbin
Assistant Examiner—P. M. Dzierzynski
Attorney, Agent, or Firm—Rhodes and Boller

[57] ABSTRACT

A day/night rearview mirror comprises an optical medium which is electrically driven between transmissive and opaque states. The mirror comprises a housing containing a circuit board assembly over which a mirrored reflecting surface is disposed. The mirrored reflecting surface is in turn overlaid by an optical transmission plate containing the optical medium. The transmission plate, mirror and circuit board are retained on the housing by means of a bezel. Electrical conductivity from the circuit board to the transmission plate is provided by helical coiled spring conductors which are conveniently supported in sleeves integrally formed with a retaining frame for the mirrored reflecting surface of the mirror. The circuit board contains a circuit for controlling the optical transmission plate and suitable controls which are accessible to the user to adjust certain operational characteristics of the mirror assembly. It also includes a pair of photodetectors forming sensors which sense general ambient lighting conditions and incident light from the field of view, respectively. The sensors are coupled in electronic input circuits to a logic gate. The output of the logic gate controls the optical transmission plate. The transmission plate is forced to an opaque condition only when both a nighttime ambient condition is sensed and there are also bright lights form the field of view incident upon the mirrored reflecting surface. The circuits impose certain timing requirements on changes in sensed conditions so that the mirror does not change state in response to momentary departures form generally prevailing conditions.

25 Claims, 7 Drawing Figures

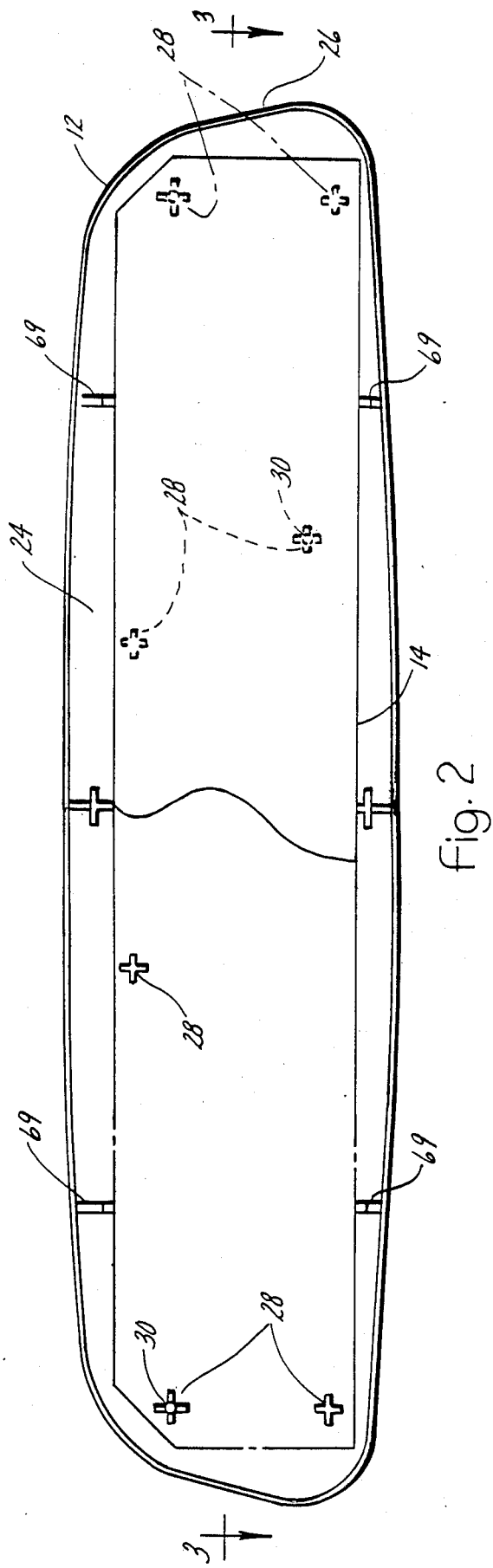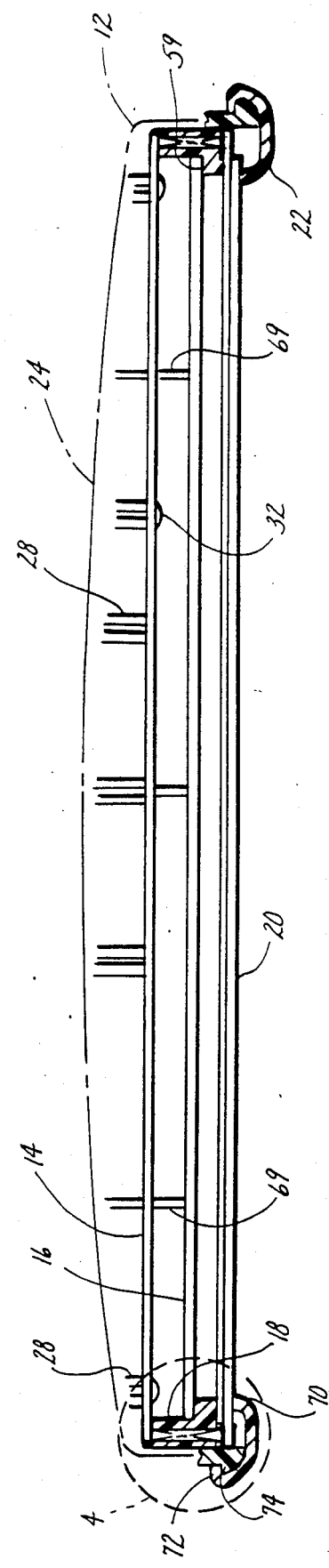

DAY/NIGHT MIRROR

BACKGROUND AND SUMMARY OF THE INVENTION

The present invention relates to a day/night rearview mirror. More specifically it relates to a day/night mirror in which an optical medium is electrically driven between transmissive and opaque states to impart the day/night characteristic to the mirror.

Day/night rearview mirrors are often used in automotive vehicles, particularly for the benefit of the driver so that at night he or she is not blinded by bright headlights from a trailing vehicle.

Known types of day/night rearview mirrors comprise mechanical operators for selectively positioning the mirrored surface depending upon prevailing conditions. Most of these are manually set by the driver to either one position for daytime use or another position for night use. For example, one way is by flipping a lever. It is also known to perform the repositioning automatically, for example by an electromechanical device.

Another class of day/night rearview mirrors comprises an optical transmission plate disposed in front of the mirrored reflecting surface. The optical transmission plate comprises a medium whose optical properties are controlled by the application of voltage to the medium. One particular type of transmission plate comprises a fluid medium disposed as a thin film between glass plates. When the medium is in its transmissive or non-opaque state, it does not attenuate light passing through it to any appreciable extent. This is the state which should be present for daytime operation so that maximum brightness of the reflected daylight scene is presented to the observer.

When the medium is operated to a less transmissive, or opaque state, it significantly attenuates light passing through it. Therefore, the brightness of the scene which is reflected to the observer is considerably less than for daytime operation; however, this nighttime mode of operation is to protect the observer from being blinded by headlights from a trailing vehicle.

Different types of media can be used, dichroics and nematics being examples of known fluid media. An individual medium has its own particular properties correlating the degree of opaqueness with the magnitude of applied voltage. For some media, this is a direct characteristic while for others it is an inverse characteristic. In other words in a direct characteristic, the medium has full light transmission at zero input voltage, and the opaqueness increases with increasing voltage up to a maximum opaqueness at and above a particular voltage. An inverse characteristic is just the opposite.

Mirrors embodying an optical transmission plate containing a medium which is electrically controlled to control brightness are desirable because mechanical actuators and mechanisms are not employed. Mechanical and electromechanical types of actuators and mechanisms have been deemed unacceptable to the original equipment automotive industry for various reasons, and one significant reason is that they have been unable to meet the rigorous demands which automobile manufacturers require for quality functional products.

The general idea of using an electrically controlled optical transmission plate in association with a rearview mirror is known.

The following patents are known. U.S. Pat. Nos. 3,280,701; 3,337,286; 4,299,444; 4,201,451; 3,862,798; 4,200,361; U.K. No. 2,029,343; and Fed. Rep. of Germany No. 2,808,260.

It is recognized in certain of these patents that a photocell sensing light from the rear can be used to automatically control the operation of the day/night mirror. Certain patents also show ambient sensors which attempt to distinguish between day and night conditions.

The present invention, in one respect, relates to a new and improved day/night mirror of the type in which the day/night operation is controlled by control of the voltage applied to a medium whose optical properties are related to voltage.

In order to achieve acceptable modes of operation in a day/night mirror, it is important to adequately distinguish true day from true night conditions so that when daytime prevails the mirror remains in the full brightness condition, yet at nighttime it will be opaque when headlights from a trailing vehicle are incident upon it.

The present invention includes a new and unique control which comprises one photodetector for sensing light incident upon the mirror from the rear, i.e. headlights from the rear, and a second photodetector which takes into account ambient conditions, the circuit being organized and arranged in a new and unique manner to achieve a new and unique form of control for this type of rearview mirror.

A further aspect of the present invention relates to a new and unique organization of various component parts in their assembled relationship in the mirror assembly. This is of particular advantage for several reasons, one of which is that a mirror can be fabricated with convenient, cost-effective fabrication procedures while also resulting in a final construction which is functional, yet sturdy and durable and in which certain operational characteristics can be easily set by the observer.

One specific aspect of the invention involves the organization and arrangement of certain parts for making electrical connection between the transmission plate and a circuit board containing the control circuit.

A further specific aspect of the invention comprises the arrangement of user-operable controls on the mirror for convenient accessibility by the observer.

While the invention is illustrated as connected to an external power supply, it can also be adapted to a self-contained battery operation and wherein a dead battery can be readily replaced.

The foregoing features, advantages and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

BRIEF DESCRIPTION OF THE DRAWINGS

FIG. 2 is a view of a portion of the assembled mirror taken generally in the direction of arrows 2—2 in FIG. 1 but with certain portions broken away.

FIG. 3 is a fragmentary cross sectional view taken substantially in the direction of arrows 3—3 in FIG. 2 illustrating details of the assembled relationship.

DESCRIPTION OF THE PREFERRED EMBODIMENT

Figure 1:
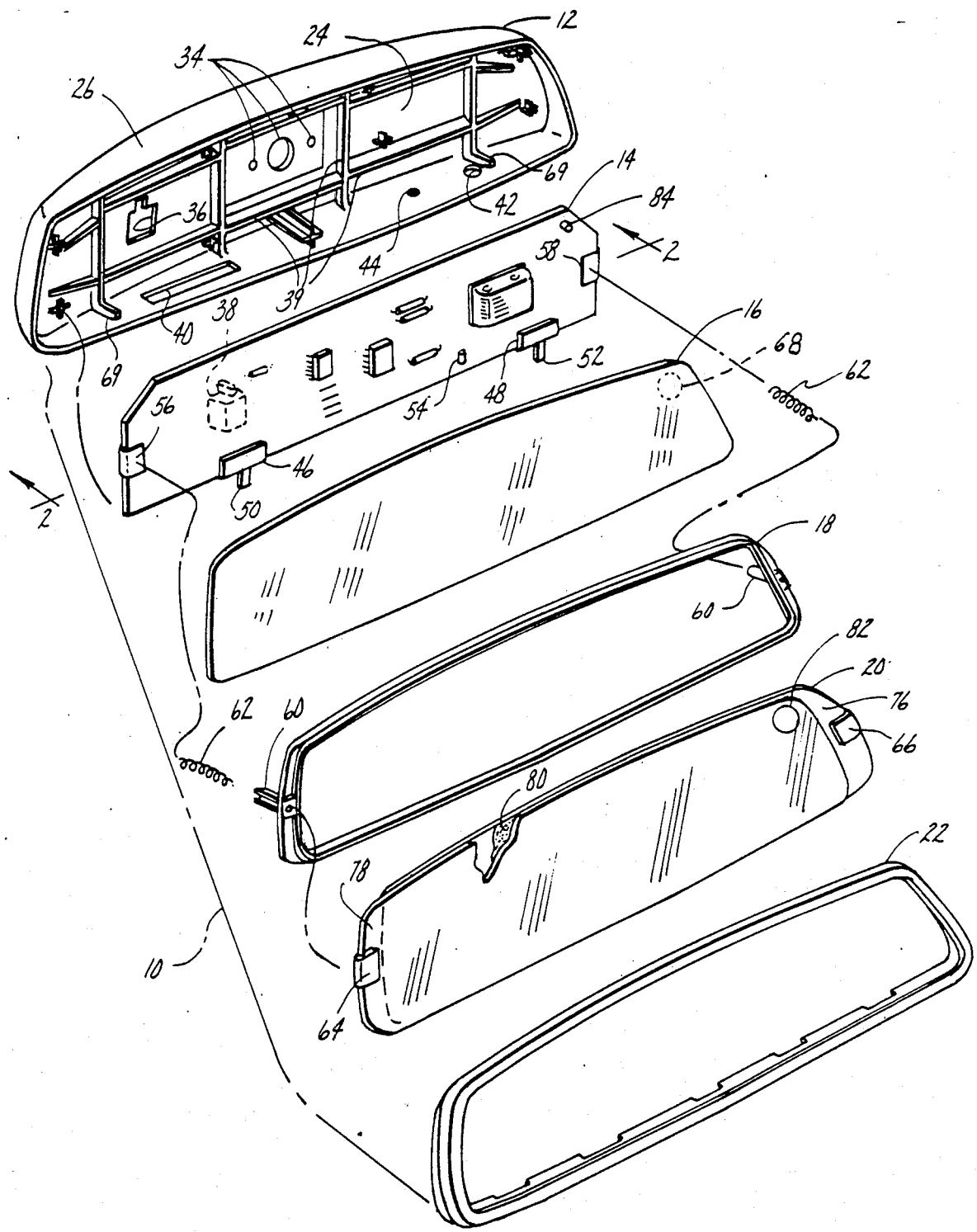
FIG. 1 is an exploded perspective view of a mirror assembly embodying principles of the present invention.

FIG. 1 illustrates in an exploded form a mirror assembly 10 according to principles of the present invention. The mirror assembly comprises a housing 12, a circuit board assembly 14, a reflecting mirror 16, a mirror retainer frame 18, an optical transmission plate 20 and a bezel 22. The components 14 through 20 assemble into housing 12 and are retained by means of bezel 22 being assembled onto and in an interlocking relationship with housing 12. Details of how this is accomplished will be subsequently explained and seen with reference to the various drawing figures.

Figure 5:
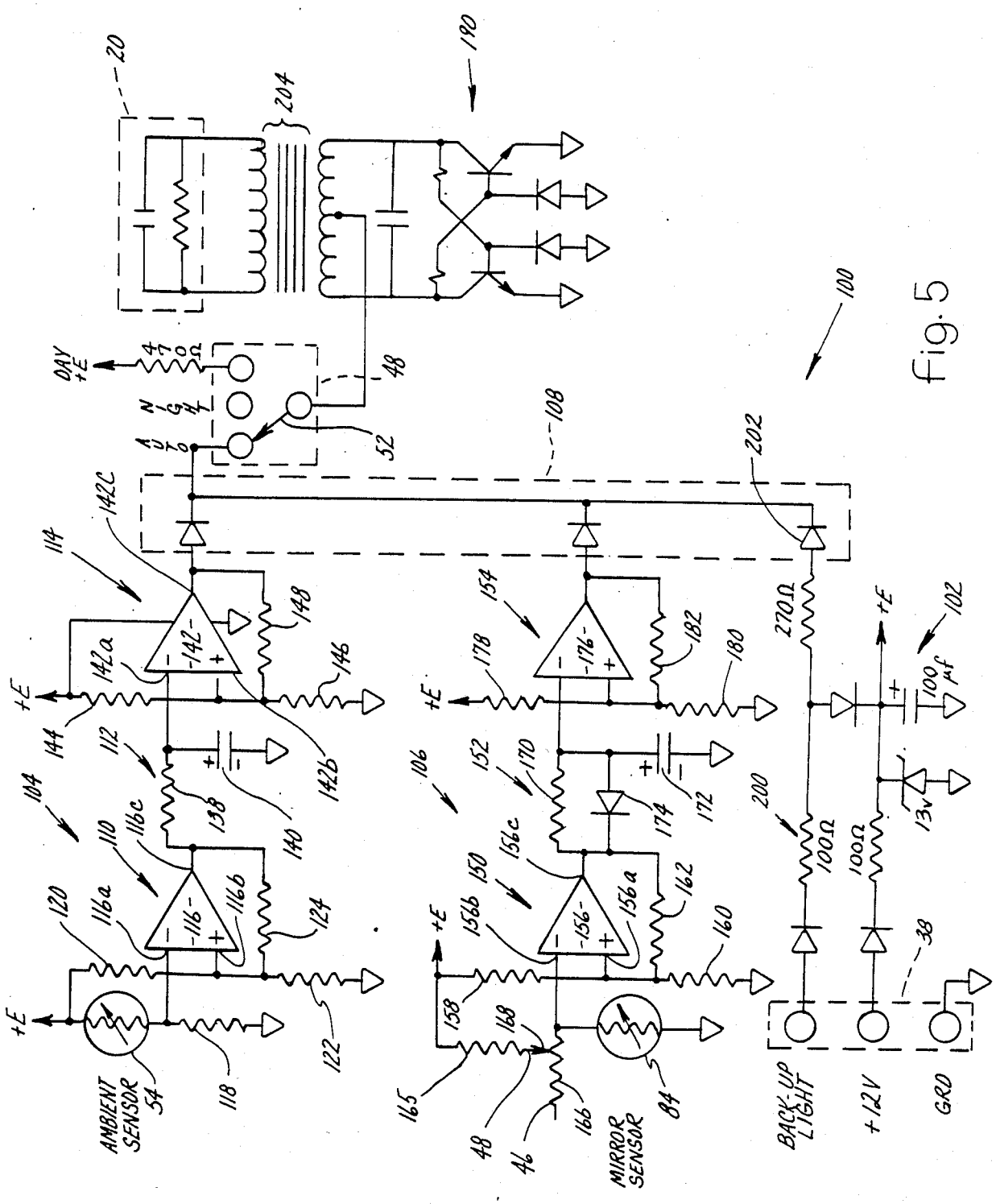
FIG. 5 is an electrical schematic diagram illustrating a presently preferred embodiment of control circuit according to the present invention.

The electronics of the circuit shown in FIG. 5 are contained on circuit board assembly 14. The circuit board comprises the various circuit components disposed against its near face. The circuit connections of the various components are on the reverse, or far, face where they cannot be seen in FIG. 1. Circuit board assembly 14 has a generally rectangular shape fitting into the interior of housing 12.

Housing 12 comprises an end wall 24 bounded peripherally by a side wall 26. Circuit board assembly 14 is accurately located within housing 12 on end wall 24. For this purpose end wall 24 comprises a plurality of integral posts 28 which project away from it. FIGS. 2 and 3 illustrate such posts 28. Certain posts 28 include locator tips 30 on their distal ends which project through corresponding holes in the circuit board. The circuit board is thereby accurately located in assembly. The circuit board may be held against the posts by the overlying parts 16, 18, 20, and 22 when the latter are assembled onto the housing, or attachment means can be provided. For example, as shown, the free ends of the tips can be deformed into heads 32 to secure the circuit board in place.

The housing is preferably constructed from a suitable plastic material with tips 30 being shaped to provide for corresponding holes in the printed circuit board to pass onto them so that the board bears against the ends of the posts. The free ends of any tips which project beyond the near face of the circuit board can be deformed by any suitable means to form the heads 32 which retain the circuit board on the housing in a secure manner. Of course other attachment means may be used if desired.

A set of suitable apertures 34 is provided centrally in end wall 24 to provide for the attachment of a mount (not shown) for mounting the mirror assembly for example to the windshield in the case of interior usage. A further aperture 36 is also provided to receive a connector plug 38 on the far face of circuit board 14 so that a mating plug on a wiring assembly (not shown) which conducts electrical power to the mirror assembly can be connected. The housing also comprises an integral structural framework 39 for rigidity.

The bottom portion of the housing's peripheral wall 26 comprises an elongated slot 40 to one side, and two circular holes 42 and 44 on the other. Two electrical control devices 46 and 48 are provided on the near face of circuit board assembly 14 adjacent the bottom edge thereof. These devices have respective operators 50 and 52 which, when the circuit board is assembled to the housing, pass through slot 40 and hole 42 respectively. A photodetector 54 is also provided on the circuit board assembly and is disposed with its sensing zone directly above hole 44. The relative dimensions of circuit board assembly 14 in relation to housing 12 are such that the circuit board can be passed through the opening bounded by wall 26 and positioned to dispose operators 50 and 52 passing downwardly through slot 40 and hole 42 respectively.

From this much of the description it can therefore be appreciated that the circuit board assembly is securely assembled and accurately located with respect to housing 12.

The circuit board is further provided with a pair of terminals 56 and 58 respectively adjacent the midpoints of the side edges thereof. Terminals 56 and 58 provide the control voltage for transmission plate 20 in a manner to be described in more detail hereinafter. Terminals 56, 58 may take any suitable form, for example U-shaped clips fitted onto the side edges of the circuit board, to establish connection with particular circuits on the far face of the circuit board. Contact to the transmission plate can be made via the near face as seen in FIG. 1.

Mirror 16 is shaped to fit over and essentially conceal circuit board assembly 14. The mirror's periphery is also shaped to fit snugly within a groove 59 which extends around the perimeter of retainer frame 18 and which faces end wall 24 of housing 12. Retainer frame 18 also comprises a pair of small integral sleeves 60 substantially at the midpoint of each of its two shorter sides. These sleeves 60 extend toward circuit board assembly 14 and form respective holders for respective spring connectors 62 which serve to make electrical connection between terminals 56, 58 respectively and terminals 64, 66 respectively on transmission plate 20.

Figure 4:
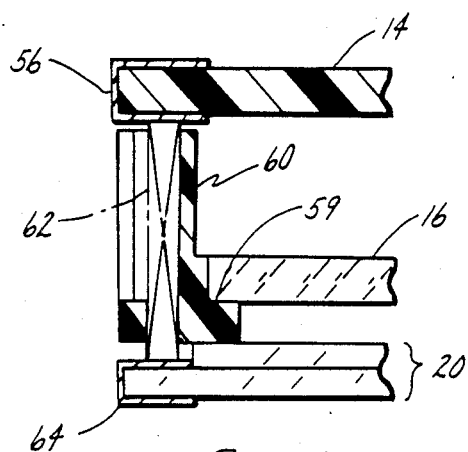
FIG. 4 is an enlarged view in circle 4 of FIG. 3, with certain portions being broken away.

Transmission plate 20 fits over and against the near face of retainer frame 18. Bezel 22, when assembled to housing 12, serves to hold the transmission plate 20, retainer frame 18, and mirror 16 in assembly relationship on housing 12. In the assembled mirror, connectors 62, which are in the form of helical coiled springs, are disposed within sleeves 60 with one end of each connector bearing against the corresponding terminal 56, 58 of circuit board assembly 14 and the opposite end against the corresponding terminal 64, 66 of transmission plate 20. FIGS. 3 and 4 show details.

It can be seen in FIG. 2 that a further posts 69 extend from the end wall of the housing, and it is against these further posts that mirror 16 abuts in the assembled mirror. Thus, in effect, bezel 22 serves to sandwich transmission plate 20, retainer 18, and mirror 16 in a secure manner against the housing end wall.

The length of each sleeve 60 is made less than the length of its connector 62, and each connector 62 is made of such a length that in the assembled mirror, they are compressed axially between the terminals on the transmission plate and those on the circuit board assembly such that a satisfactory electrical connection is established between the circuit board and the transmission plate. Sleeves 60 serve to hold and correctly locate the spring contacts 62. The construction is advantageous not only functionally but also from a manufacturing standpoint. All that need be done is to place the springs in the sleeves during assembly, and to assemble the components together in the manner of sandwiching as described above.

It can be seen in FIG. 2 that bezel 22 comprises a lip 70 around its inner periphery which bears against the periphery of transmission plate 20. The outer periphery of the bezel comprises a lip 72 which locks with a catch 74 extending around the outside of the free edge of housing side wall 26 when the bezel is assembled to the housing. With this arrangement no separate attaching parts are required and the bezel serves to retain the components within housing 12 in a secure and what is intended to be a permanent manner. Bezel 22 and retainer frame 18, like housing 12, can be molded plastic parts.

Transmission plate 20 is illustrated as comprising a pair of glass plates 76, 78 respectively with an optical medium 80 captured between them as a very thin film. Dichroics and nematics are examples of known fluid media which may be used for optical medium 80. Conductors deposited as extremely thin films on the confronting surface portions of the two glass plates are selectively energized from circuit board 14 via the two connectors 62 to control the optical character of optical medium 80 and thereby endow the mirror assembly with day/night capability. As can be seen in FIGS. 1 and 3, terminal 64 fits onto the edge of the near glass plate 78, and is in electrical contact with the conductive film on that plate. Terminal 64 is shown as a U-shaped clip. The side edges of the two plates are not congruent so that in the case of the left-hand side as viewed in FIG. 1, plate 76 is clear of terminal 64, and in the case of the right-hand side, plate 78 allows terminal 66, a U-shaped clip also, to fit onto the edge of plate 76 to make contact with the conductive film on that plate. Thus, the two spring connectors make contact between terminals 56 and 64 on the left and between terminals 58 and 66 on the right.

The far upper corner of transmission plate 20 is left clear of medium 80 so that the two glass plates are fully transparent in this region 82. In the assembled mirror, region 82 registers with a non-silvered, transparent region 68 of mirror 16 and a second photodetector 84 on printed circuit board assembly 14. This second photodetector is so arranged that its sensing element senses light incident upon the mirror from the rear, i.e., it senses light passing through regions 82 and 68.

The sides of the sleeves 60 comprise longitudinal slots extending partially along their lengths. Both sleeves and slots may have a slight taper (i.e. draft) which is imparted in the manufacture of part 18 which is preferably an injection molded plastic.

The fabrication of transmission plate 20 may be accomplished with known fabrication procedures. The films of conductors on the two plates are ultra-thin films, such as gold, which can be deposited to provide suitable conductivity for purposes of controlling the optical medium but without any significant attenuation of light transmission.

With this much of a description having been given, it is now appropriate to consider details of the electronic control circuit contained on printed circuit board assembly 14.

FIG. 5 schematically portrays a presently preferred embodiment of control circuit for the transmission plate. Like components in the several drawing figures are identified by like reference numerals and therefore the electrical schematic diagram illustrates the devices 46 and 48 and their respective operators 50 and 52, along with the two photodetectors 54 and 84.

The control circuit is designated by the general reference numeral 100 and power for the circuit is delivered via connector plug 38 which connects to a mating plug (not shown) of the vehicle's wiring harness to supply vehicle battery power (i.e. +12 volts relative to ground) to circuit board assembly 14.

Because various electronic circuit components require a well-regulated DC supply, a simple regulator circuit 102 receives the battery voltage and develops a regulated supply voltage +E volts relative to ground. This is supplied to the various circuits as indicated in the schematic.

Photodetector 54 is disposed within the mirror assembly with its sensing zone facing downwardly to sense light passing through hole 44. As such it senses the general prevailing ambient light level and hence for convenience will hereinafter sometimes be referred to as the ambient light sensor. It is to be observed that this sensor does not face toward the field of view and therefore is not directly subject to incident light from the rear. It is however sensitive to the prevailing ambient light level which in daytime will be a general daytime brightness and at night a general darkness but with the expectation that at night the sensor can be subject to reflected or direct artificial light sources. These sources could be the vehicle's own interior lights, or they could be external lights such as street lights, parking lot lights, lights of other vehicles.

Sensor 54 is intended to face directly toward the vehicle's dashboard, which will typically be a low reflectivity, or light scattering, surface. However depending upon the exact positioning of the sensor and the size of hole 44 and the nature of the specific vehicle construction, the sensor may have a certain sensitivity to other than the light from the dashboard.

Photodetector 84 was previously described as facing toward the rear field of view so that its sensing zone is responsive to incident light from the rear. For convenience photodetector 84 will sometimes hereinafter be referred to as mirror sensor 84.

Ambient sensor 54 is connected in one input circuit 104 while mirror sensor 84 is connected in another input circuit 106. The two input circuits 104, 106 have respective outputs which are supplied as inputs to respective input terminals of a logic gate 108. Briefly the output of logic gate 108 controls transmission plate 20, and the illustrated logic gate 108 is an OR logic gate constructed from diodes. The general operational logic is such that the mirror is forced to its bright state when either daytime is sensed by ambient sensor 54, or when there are no bright lights from the rear sensed by mirror sensor 84. Stated differently, the mirror is forced to its dark state only if nighttime and bright lights from the rear are both sensed.

For convenience of description circuit 104 may be considered to comprise a first stage 110 coupled via a timing circuit 112 to a second stage 114. The output of the second stage 114 forms an input to a corresponding input of logic gate 108.

Ambient sensor 54 is operatively coupled in the input circuit of stage 110. Stage 110 comprises an operational amplifier 116 which comprises an inverting input terminal 116a, a non-inverting input terminal 116b, and an output terminal 116c.

Ambient sensor 54 connects in series with a resistor 118 and this series combination is connected across the +E supply. The junction of ambient sensor 54 and resistor 118 is connected to the inverting input terminal 116a of amplifier 116.

A pair of resistors 120 and 122 connect in series across the +E power supply and their junction is connected to the non-inverting input terminal 116b of amplifier 116. A resistor 124 is connected between output terminal 116c and the input terminal 116b.

The signal which is provided to the non-inverting input 116b defines a threshold. The signal supplied to the inverting input 116a is measured against the threshold.

The ambient light level sensed by sensor 54 causes a corresponding signal to be supplied to input 116a. As the ambient light level varies so does the signal to input 116a. The arrangement is such in the disclosed preferred embodiment that operational amplifier 116 operates in what may be generally designated as a switching mode. This in effect means that the output signal which appears at terminal 116c many assume either a "high" or a "low" state.

Because of the provision of resistor 124, the threshold level at input 116b becomes a function of the state of the output signal at 116c as coupled by resistor 124 back to the common junction of the three resistors 120, 122, 124.

Figure 6:
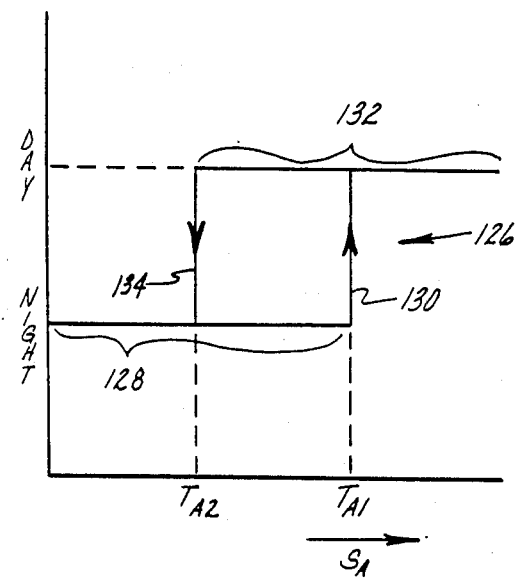
FIGS. 6 and 7 are graph plots useful in explaining principles of operation of the control circuit.

In order to aid in explaining the operation of stage 110 reference is also made to FIG. 6 which shows a graph plot 126 illustrative of the operation. Graph plot 126 comprises four segments identified by the reference numerals 128, 130, 132, and 134.

If it is assumed that stage 110 is in a state indicative of nighttime, segment 128 applies. So long as the ambient light sensor level indicates a light intensity below the threshold designated $T_{A1}$, the stage 110 does not change state. However, if the threshold $T_{A1}$ is exceeded, then the state of the stage changes to establish an output indicative of daytime. The transition, which is in the form of a step, may be considered as occurring along segment 130 so that the new state corresponding to daytime conditions is represented by segment 132.

When the output of the amplifier stage changes, the effect is fed back via resistor 124 to change the threshold fro $T_{A1}$ to $T_{A2}$, a lower threshold level. For the stage to switch back to a state represented by the segment 128, the level sensed by sensor 54 must fall below that corresponding to the new lower threshold $T_{A2}$. The transition back to segment 128 will occur along the segment 134.

From consideration of FIG. 6 it can thus be appreciated that the construction embodies a hysteresis characteristic in the operation of the stage. Importantly, the difference between the thresholds represented by segments 134 and 130 corresponds to a difference of 2 to 1 in respective sensed intensities. This 2 to 1 ratio corresponds approximately to the minimum difference which can be sensed by the typical human eye. In other words, in order for the stage to revert to daytime from nighttime indication the ambient light level must change noticeably from that which caused the change to nighttime, and vice versa. Because of this attribute, the circuit responds only to changes in light intensity which would have an effect on the typical observer and it avoids response to changes which would not be perceptible to the average observer.

Based upon this description of operation of stage 110 it can be appreciated that the stage provides a step input to timing circuit 112 whenever there is a transition between day and night. It can be further appreciated that the direction of the step will be one way for a transition from night to day while it will be in the opposite direction for an opposite transition.

Circuit 112 comprises a resistor 138 and a capacitor 140 which form an RC timing circuit characterized by a particular time constant. In response to a step input to circuit 112 from the output of circuit 110, the voltage at the junction of resistor 138 and capacitor 140 executes an exponential transient, and the direction of this transient will be one way for a night- to-day transition and opposite for the opposite transition.

The junction of resistor 138 and capacitor 140 is connected to an input to stage 114. Stage 114 comprises an operational amplifier 142 having inverting and non-inverting input terminals 142a, 142b respectively and an output terminal 142c. The output from timing circuit 112 forms an input to the inverting input terminal 142a.

A pair of resistors 144, 146 are connected in series across the +E supply and their junction is connected as an input to the non-inverting input terminal 142b. A further resistor 148 connects output 142c to input 142b.

Stage 114 may be considered to operate in a switching mode such that the output signal at output 142c will be either high or low. The state is determined by the relationship of the signals to the two inputs 142a, 142b.

The signal supplied to input 142b forms a threshold, and the level of this threshold depends upon the state of the output signal at 142c. Hence this stage may be considered to have a hysteresis characteristic similar to that illustrated in FIG. 6, but the hysteresis characteristic of stage 114 is for a very different purpose.

Stage 114 operates to change state a certain pre-calculated time after a step input is supplied to timing circuit 112 regardless of the direction of the step. This may be understood by considering that when the step input to circuit 112 is in one direction, the exponential transient will be in a corresponding direction, say a rising direction. For stage 114 to always switch at the sam pre-calculated time after a step regardless of the direction of the step, the transient is always allowed to execute one time constant (i.e. the product of resistor 138 and capacitor 140). A rising exponential transient will attain approximately 63% final value in one time constant and a falling transient will attain approximately 37% of its final value in one time constant. The provision of resistor 148 in association with resistors 144 and 146 serves to establish these two respective levels, 63% in the case of a rising signal and 37% in the case of falling signal.

Timing circuit 112 serves to impose a delay in the switching of stage 114 which otherwise would occur essentially instantaneously in response to a step in the output of stage 110. The purpose of providing the delay in circuit 104 is to avoid a false response of the circuit to temporary conditions which may not be representative of the true longer term general ambient condition. For example, when the circuit has properly assumed a nighttime indicating state, temporary bursts of ambient light, such as might occur when passing beneath spaced apart street lights or by the lighting of a cigarette lighter, and which are of momentary duration but which may create intensities on the ambient sensor exceeding the prevailing threshold at input 116b are prevented from having an ultimate effect on the output of circuit 104.

In the case of circuit 112 it can be seen that this timing requirement is bi-directional; in other words delay is imposed not only for a day-to-night transition but also for a night-to-day one.

By imposing delay in the expectation that many such temporary conditions will last less than one time constant of the timing circuit even though they exceed the prevailing threshold, many spurious changes are avoided. It is to be recognized that an exponential transient which is initiated in response to a change in the output of stage 110 will decay exponentially back to its initial value once the output of stage 110 reverts back to its previous state. However, where a change past the prevailing threshold lasts for longer than one timing circuit time constant, that is deemed representative of true change, or an apparently true change. An example of an apparently true change to daytime would be the nighttime presence of the automobile in a well-lighted parking lot for an amount of time longer than the one time constant, and in that environment it may be desirable for a daytime indication to be given so that the mirror will assume its bright state.

The selection of parameters may be such that stage 110 will change state at the appropriate sensed levels without the need for any separate calibration; however if desired, a calibration feature could be included. For example this might involve an adjustable resistance in association with the input circuit containing the ambient sensor.

Circuit 106 is in many respects very similar to circuit 104 and therefore certain features will be described in detail since their organization and arrangement and mode of operation will be recognized from the preceeding detailed description of circuit 104.

Circuit 106 comprises a first stage 150, a timing circuit 152 and a second stage 154 with the output of stage 150 being operatively coupled with the input of stage 154 through timing circuit 152.

Stage 150 comprises an operational amplifier 156 having inverting and non-inverting and input terminals 156a, 156b respectively and an output terminal 156c. A threshold signal is supplied to the non-inverting input 156a. The level of the threshold signal is established at the common junction of two resistors 158 and 160 connected serially across the power supply as modified by the further resistor 162 in accordance with the condition of the output signal of stage 150. Hence this stage is very similar to stage 110. and its operation is characterized by a similar graph plot 164 in FIG. 7. Depending upon the state of stage 150 the threshold is either at a level or at a level $T_{M1}$.

Mirror sensor 84 is operatively coupled in an input circuit to the inverting input terminal 156a. This circuit comprises a resistor 165 and a selectable portion of a potentiometer 166 as selected by a wiper 168. The potentiometer 166 is the device 46 while the wiper 168 is under the control of operator 48.

Figure 7:
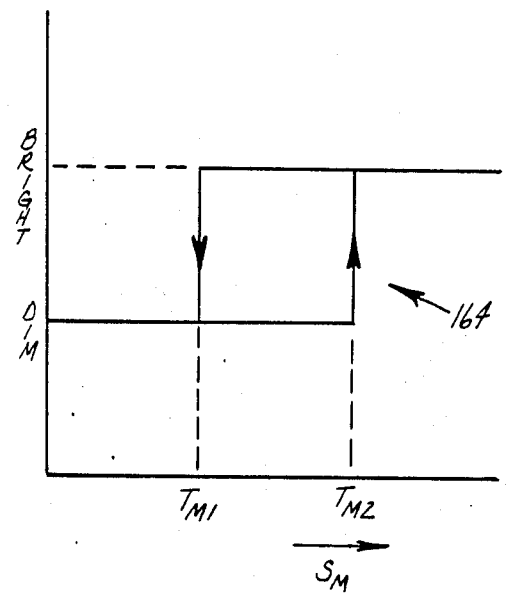

FIG. 7 illustrates the operational characteristic of stage 150 for a given setting of potentiometer wiper 168. The characteristic is similar to that of the ambient sensor's circuit in that the two threshold levels $T_{M1}$ and $T_{M2}$ differ by an intensity difference of approximately a 2 to 1 ratio. The adjustment provided by the wiper 168 potentiometer 166 is effective to shift the characteristic curve of FIG. 7 horizontally. In other words although the actual threshold voltages at which the stage switches do not change, either a greater or lower intensity of light is required for the input to the non-inverting input terminal to pass through the prevailing threshold.

Thus from the description and consideration of FIG. 7 it can be appreciated that when the mirror sensor is sensing the presence of bright lights from the rear, stage 150 provides a brightness indication and when the mirror sensor fails to detect bright lights stage 150 provides a dim indication.

Timing circuit 152 is similar to timing circuit 112 in that it comprises an RC timing circuit comprising a resistor 170 and a capacitor 172, but it also includes a diode 174 poled as shown. The purpose of diode 174 is to render the operation of the circuit uni-directional; in other words a timing requirement is imposed only on a rising transient then the step input to the timing circuit is from low to high, but not on a falling step. In the illustrated circuit a rising transient occurs in response to the disappearance of bright lights from the rear, and therefore an already darkened mirror will not immediately brighten. This is desirable because the disappearance of bright incident light from the rear may be only a momentary phenomenon, for example when the automobile has just passed over a hill or around a curve and a trailing vehicle with its headlights on has not yet negotiated either.

However when the mirror sensor is indicating a dim field of view, and then suddenly senses a bright one, the change in the output of stage 150 is not delayed by circuit 152 so that the effect on stage 154 is immediate. The purpose is to provide as instantaneous a response as possible to the sudden appearance of bright lights from the rear.

The optical transmission plate may inherently possess a certain delay in switching from one state to the other. While this may be desirable in the case where the transition is from a bright to a dim field of view, it may not be deemed long enough and therefore the uni-directional character of the timing circuit can augment an inherent delay in response of the optical transmission plate for that type of transition. In the case of the opposite transition, the circuit insures that essentially the only delay in darkening the mirror will be that which is inherent in the characteristics of the optical medium itself.

Stage 154 has a configuration exactly identical to that of stage 114. It comprises an operational amplifier 176 and three resistors 178, 180, 182 connected as illustrated. These resistors establish the threshold for a rising exponential transient, and although the threshold is diminished for a falling transient, the diminished threshold is of no significant consequence because diode 174 essentially shorts out resistor 172 so that the fall is essentially instantaneous.

Diode logic gate 108 comprises plural diodes having cathodes connected in common. The anode of one diode connects to the output of circuit 104 and the anode of another diode 186 connects to the output of circuit 106. When the output of either circuit 104 or 106 is high, the OR logic gate 108 provides a corresponding high output signal at the common cathodes. This output signal is used to control the optical transmission plate when device 48, which is a selector switch, is in what is called the automatic position. This position is indicated in FIG. 5 where the operator 52 has set the switch to establish continuity from the output of the OR logic gate 108 to an oscillator circuit 190 which can develop an oscillating voltage for delivery to transmission plate 20.

When the output of OR gate 108 is high and switch 48 is in the automatic position, oscillator 190 is energized to cause full voltage to be applied across the transmission plate. With the medium being a material which has an inverse characteristic, the application of full voltage causes the medium to be transparent so that the mirror is bright. When the voltage is removed, the medium goes opaque so that the mirror darkens.

Only under the condition where outputs from both circuits 104 and 106 are low will the oscillator circuit not be energized, and under this condition the optical transmission plate will be opaque. This corresponds to circuit 104 indicating the presence of bright headlights from the rear.

Under other conditions the mirror is allowed to assume full brightness. These other conditions are: (1) when circuit 104 indicates daytime regardless of what circuit 106 indicates; and (2) when circuit 104 indicates nighttime and circuit 106 senses the absence of bright lights from the rear. Under these conditions it is acceptable and indeed even desirable for the mirror to be at full brightness.

It is possible to override the automatic control and provide either a continuously darkened or a continuously bright mirror by operation of switch 48 to appropriate positions. These are designated in the drawing figure as "night" and "day". In the night position the oscillator is not energized while in the day position it is.

The illustrated circuit 100 also includes a third input circuit 200 and a third diode 202 in the OR logic gate. The third input circuit connects to the vehicle's back-up lamp circuit. The backup circuit is energized when the vehicle's transmission is placed in reverse, and thus causes a high signal which is applied to the anode of the third diode 202 of gate 108. With switch 48 in automatic this causes oscillator 190 to be energized regardless of the conditions of the other two input circuits 104, 106 to the diode logic gate. In other words when the vehicle is placed in reverse gear, the mirror is caused to assume full brightness even if the ambient sensor and the mirror sensor were otherwise calling for the mirror to be darkened. It will be appreciated that the back-up lamp input circuit introduces no delay so that the only delay which occurs when the transmission is put in reverse will be that which is inherent in the optical transmission plate's characteristic. Rather than the backup lamp circuit being directly connected to the input of the diode gate, appropriate isolating provisions are made to prevent transients which may be present in the vehicle wiring from intruding into the mirror control circuit and likewise provision is made for preventing feedbacks from the minor control circuit both to the back-up lamp circuit and also to the vehicle battery.

Oscillator 190 for driving optical transmission plate 20 is shown to comprise a conventional push-pull configuration and with power being coupled through a transformer 204 whose secondary is connected across the transmission plate.

In the case of an optical material which has a direct characteristic and not an inverse characteristic, appropriate provision can be made to ensure correct operation, for example by placing an inverter in the line from switch 48 to oscillator 190. It is also to be recognized that different configurations for the logic and for the coupling of the logic with the optical transmission plate can be employed other than that shown.

Based upon the foregoing description the reader will appreciate that a new and unique arrangement for a day/night mirror has been disclosed. In any given implementation of principles of the invention, particular constructional differences may exist from the disclosed embodiment. The illustrated embodiment is one which is well-suited to mass production application for automotive rearview mirror usage. It is cost-effective and can meet the demands of automobile manufacturers. The four operational amplifiers are implemented in a single integrated circuit chip. The mirror can be fabricated with conventional procedures and is well-suited to automated assembly. Power levels required for operation of the optical medium are low. While the illustrated embodiment shows the mirror to be energized from the vehicle battery, it is possible to implement the design such that a separate replaceable battery is used. Such a battery can be removably inserted by a removable cover provided in the mirror housing, and this would render the mirror suitable for aftermarket usage where a wiring harness may not be convenient to desired location for the mirror.

The following identifies the components of the circuit with reference to specific values and identifications. This list is considered to be representative of the preferred embodiment, and it will be appreciated that principles of the invention are applicable to other embodiments. For example, the mirrored surface could be incorporated into the transmission plate.

| | |
|---|---|
| Resistors 120, 122, 144, 146, 158, 160, 178, 180 | 100K |
| Resistors 124, 162 | 390K |
| Resistors 138, 152 | 1 M |
| Potentiometer 166 | 100K |
| Resistor 118 | 15K |
| Resistor 165 | 1K |
| Resistors 148, 182 | 150K |
| Sensors 54, 84 | Vactec VT82L (LDR's) |
| Capacitors 140, 172 | 10 μF |
| Diodes of OR gate 108 and Diode 174 | 1N4148 |
| Op Amps 116, 142, 156, 176 | LM324 |
| Transformer 204 | 1K:20K, 100 mW |
| Oscillator 190 Diodes | 1N4148 |
| Oscillator 190 Capacitor | 0.1 μf |
| Oscillator 190 Resistors | 10K |
| Oscillator 190 Transistors | 2N4401 |
| Regulator 102 Diodes | 1N4004 |
| Regulator 102 Zener | 1N4743A |

What is claimed is:

1. In a day/night rearview mirror assembly having a mirrored surface in association with a voltage-controlled optical medium wherein the medium controls the brightness of the field of view reflected by the mirrored surface in accordance with voltage applied to the medium and a control circuit for applying control voltage to the medium including a sensor for sensing incident light from the field of view to distinguish between a field of view which is bright and one which is dim and a second sensor for sensing general ambient light in the vicinity of the mirror assembly to distinguish between daytime conditions and nighttime conditions, the improvement which comprises said control circuit comprising means for operating said mirror assembly to two different states of brightness, one higher and the other lower, comprising a logic gate having an output and plural inputs, means operatively coupling the logic gate output with the optical medium such that the logic gate output causes control voltage to be selectively applied to said medium to thereby selectively operate the mirror assembly to the two different states of brightness in accordance with a control provided by said logic gate, plural input circuits each of which has an output connected to a corresponding one of the inputs of said logic gate, one of said input circuits containing the first-mentioned sensor and another of said input circuits containing the second sensor, each input circuit comprising its own timing means for imposing a certain predetermined minimum time requirement on certain change sensed by the corresponding sensor before the effect of such change is allowed to occur at the output of the corresponding input circuit, the timing means of said second input circuit imposing a minimum time requirement on both a change in sensed ambient light indicative of transition from day to night as well as a change in sensed ambient light indicative of transition from night to day, and the timing means of said first input circuit imposing a minimum time requirement only on a change in sensed light from the field of view indicative of a transition from bright to dim and not on a change indicative of a transition from dim to bright.

2. The improvement set forth in claim 1 in which said one and said another input circuits each comprises a corresponding operational amplifier stage with the corresponding sensor being operatively coupled with an input of the corresponding amplifier stage, and in which change in each of the respective sensors, between bright and dim for the first sensor and between night and day for the second sensor, is effective to change the state of the corresponding operational amplifier, each operational amplifier stage including means providing a threshold signal against which a corresponding signal developed from the corresponding sensor is measured and means for selectively establishing each threshold signal in accordance with the condition of the corresponding stage's output.

3. The improvement set forth in claim 2 in which each threshold is selectively established at threshold levels corresponding to a difference in sensed light intensity of substantially a 2 to 1 ratio.

4. The improvement set forth in claim 2 in which each input circuit includes a second operational amplifier stage, and the corresponding timing means is connected between the first and second operational amplifier stages in each input circuit, each second amplifier stage having means providing a threshold at which it responds to change passed from the corresponding first amplifier stage by the corresponding timing means including means for selectively establishing the corresponding threshold in accordance with the condition of the output signal of the corresponding second operational amplifier stage.

5. The improvement set forth in claim 4 in which the timing means in said second input circuit comprises means for imposing a pre-calculated delay in passign change in the first stage's output to the second stage's input regardless of whether the change is indicative of transition from day to night or of transition from night to day.

6. The improvement set forth in claim 5 in which each timing means comprises an RC timing circuit and in which the timing means of said first input circuit comprises a diode arranged cooperatively with the corresponding RC timing circuit to prevent imposition of a minimum time requirement on a change indicative of a transition from dim top bright.

7. The improvement set forth in claim 6 in which the means providing a threshold for each second amplifier stage comprises means for establishing the last-mentioned threshold at a level which corresponds to the RC time constant of the corresponding timing circuit.

8. The improvement set forth in claim 1 in which said logic gate comprises an OR logic gate arranged to selectively control the mirror assembly to the two different states of brightness such that the low state of brightness occurs only when said first input circuit is indicating a bright condition and when said second input circuit indicates a nighttime condition.

9. In a day/night rearview mirror assembly having a mirrored surface in association with a voltage-controlled optical medium wherein the medium controls the brightness of the field of view reflected by the mirrored surface in accordance with voltage applied to the medium and a control circuit for applying control voltage to the medium including a sensor for sensing incident light from the field of view to distinguish between a field of view which is bright and one which is dim and a second sensor for sensing general ambient light in the vicinity of the mirror assembly to distinguish between daytime and nighttime conditions, the improvement which comprises means for operating said mirror assembly to two different states of brightness, one higher and the other lower, comprising a logic gate having an output and plural inputs, means operatively coupling the logic gate output with the optical medium such that the logic gate output causes control voltage to be selectively applied to said medium to thereby selectively operate the mirror assembly to the two different states of brightness in accordance with the condition of inputs to the logic gate, each sensor being operatively coupled in an input circucit to a corresponding input of the logic gate, each input circuit comprising timing means imposing certain time requirements on certain changes sensed by the sensors, said logic gate providing control such that the optical medium assumes a non-opaque condition to cause the mirror assembly to operate at the higher state of brightness if either the first input circuit is indiating the absence of bright light from the field of view or the second circuit is indicating a daytime condition and the optical medium otherwise in response to said sensors assumes an opaque condition to cause the mirror assembly to operate at the lower state of brightness.

10. The improvement set forth in claim 9 in which each input circuit comprises a first operational amplifier stage and a second operational amplifier stage, each operational amplifier stage comprises its own operational amplifier and said four operational amplifiers being contained in a quad op amp integrated circuit chip.

11. In a day/night rearview mirror assembly having a mirrored surface in association with a voltage-controlled optical medium wherein the medium controls the brightness of the field of view reflected by the mirrored surface in accordance with voltage applied to the medium and a control circuit for selectively applying control voltage to the medium including a sensor for sensing incident light from the field of view to distinguish between a field of view which is bright and one which is dim and a second sensor for sensing general ambient light in the vicinity of the mirror assembly to distinguish between daytime conditions and nighttime conditions, the improvement which comprises said control circuit comprising means for operating said mirror assembly to two different states of brightness, one higher and the other lower, comprising a logic gate having an output and plural inputs, means operatively coupling the logic gate output with the optical medium such that the logic gate output exercises control over the selective application of the control voltage to said medium to thereby selectively operate the mirror assembly to the two different states of brightness, plural input circuits each of which has an output connected to a corresponding one of the inputs of said logic gate, one of said input circuits containing the first-mentioned sensor and another of said input circuits containing the second sensor, timing means for imposing certain predetermined minimum time requirements on certain changes sensed by said sensors before such changes are allowed to affect the selective application of the control voltage to said medium, said one and said another input circuits each comprising a corresponding operational amplifier stage with the corresponding sensor being operatively coupled with an input of the corresponding operational amplifier stage, and in which change in each of the respective sensors, between bright and dim for the first sensor and between night and day for the second sensor, if effective to change the state of the corresponding operational amplifier stage, each operational amplifier stage including means providing a threshold signal against which a corresponding signal developed from the corresponding sensor is measured and means for selectively establishing each threshold signal in accordance with the condition of the corresponding operational amplifier stage's output.

12. The improvement set forth in claim 11 in which each threshold is selectively established at threshold levels corresponding to a difference in sensed light intensity of substantially a 2 to 1 ratio.

13. The improvement set forth in claim 11 in which each input circuit includes a second operational amplifier stage, and said timing means comprises timing circuits connected between the first and second operational amplifier stages in each input circuit, each second operational amplifier stage having means providing a threshold at which it responds to change passed from the corresponding first operational amplifier stage by the corresponding timing circuit including means for selectively establishing the corresponding last-mentioned threshold in accordance with the condition of the output signal of the corresponding second operational amplifier stage.

14. The improvement set forth in claim 13 in which the timing circuit in said another input circuit comprises means for imposing a pre-calculated delay in passing change in the corresponding first operational amplifier stage's output to the corresponding second operational amplifier stage's input regardless of whether the change is indiative of transition from day to night or of transition from night to day.

15. The improvement set forth in claim 14 in which each timing circuit comprises an RC timing circuit and in which the timing circuit of said one input circuit includes a diode arranged cooperatively with the corresponding RC timing circuit to prevent imposition of a minimum time requirement on a change indicative of a transition from dim to bright.

16. The improvement set forth in claim 15 in which the means providing a threshold for each second operational amplifier stage comprises means for establishing the corresponding threshold at a level which corresponds to the RC time constant of the corresponding timing circuit.

17. In a day/night rearview mirror assembly having a mirrored surface in association with a voltage-controlled optical medium wherein the medium controls the brightness of the field of view reflected by the mirrored surface in accordance with voltage applied to the medium and a control circuit for selectively applying control voltage to the medium including a sensor for sensing incident light from the field of view to distinguish between a field of view which is bright and one which is dim and a second sensor for sensing general ambient ligth in the vicinity of the mirror assembly to distinguish between daytime conditions and nighttime conditions, the improvement which comprises said control circuit comprising means for operating said mirror assembly to two different stages of brightness, one higher and the other lower, comprising a logic gate having an output and plural inputs, means operatively coupling the logic gate output with the optical medium such that the logic gate output exercises control over the selective application of the control voltage to said medium to thereby selectively operate the mirror assembly to the two different states of brightness, plural input circuits each of which has an output connected to a corresponding one of the inputs of said logic gate, one of said input circuits containing the first-mentioned sensor and another of said input circuits containing the second sensor, said one and said another input circuits each comprising a corresponding operational amplifier stage with the corresponding sensor being operatively coupled with an input of the corresponding operational amplifier stage, and in which change in each of the respective sensors, between bright and dim for the first sensor and between night and day for the second sensor, is effective to change the state of the corresponding operational amplifier stage, each operational amplifier stage including means providing a corresponding threshold signal against which a corresponding signal developed from the coresponding sensor is measured and means for selectively establishing each threshold signal in accordance with the condition of the corresponding operational amplifier stage's output, and in which each threshold is selectively established at threshold levels corresponding to a difference in sensed light intensity of substantially a 2 to 1 ratio.

18. The improvement set forth in claim 17 including timing means for imposing certain predetermined minimum time requirements on certain changes sensed by said sensors before such changes are allowed to affect the selective application of the control voltage to said medium.

19. The improvement set forth in claim 18 in which each input circuit includes a second operational amplifier stage, and said timing means comprises timing circuits connected between the first and second operational amplifier stages in each input circuit, each second operational amplifier stage having means providing a threshold at which it responds to change passed from the corresponding first operational amplifier stage by the corresponding timing circuit including means for selectively establishing the corresponding last-mentioned threshold in accordance with the condition of the output signal of the corresponding second operational amplifier stage.

20. The improvement set forth in claim 19 in which the timing circuit in said another input circuit comprises means for imposing a pre-calculated delay in passing change in the corresponding first operational amplifier stage's output to the corresponding second operational amplifier stage's input regardless of whether the change is indicative of transition from day to night or of transition from night to day.

21. The improvement set forth in claim 20 in which each timing circuit comprises an RC timing circuit and in which the timing circuit of said one input circuit includes a diode arranged cooperatively with the corresponding RC timing circuit to prevent imposition of a minimum time requirement on a change indicative of a transition from dim to bright.

22. The improvement set forth in claim 21 in which the means providing a threshold for each second operational amplifier stage comprises means for establishing the corresponding threshold at a level which corresponds to the RC time constant of the corresponding timing circuit.

23. In a day/night rearview mirror assembly having a mirrored surface in association with a voltage-controlled optical medium wherein the medium controls the brightness of the field of view reflected by the mirrored surface in accordance with voltage applied to the medium and a control circuit for selectively applying control voltage to the medium including a sensor for sensing incident light from the field of view to distinguish between a field of view which is bright and one which is dim and a second sensor for sensing general ambient light in the vicinity of the mirror assembly to distinguish between daytime conditions and nighttime conditions, the improvement which comprises said control circuit comprising means for operating said mirror assembly to two different stages of brightness, one higher and the other lower, comprising a logic gate having an output and plural inputs, means operatively coupling the logic gate output with the optical medium such that the logic gate output exercises control over the selective application of the control voltage to said medium to thereby selectively operate the mirror assembly to the two different states of brightness, plural input circuits each of which has an output connected to a corresponding one of the inputs of said logic gate, one of said input circuits containing the first-mentioned sensor and another of said input circuits containing the second sensor, said one and said another input circuits each comprising a corresponding operational amplifier stage with the corresponding sensor being operatively coupled with an input of the corresponding operational amplifier stage, and in which change in each of the respective sensors, between bright and dim for the first sensor and between night and day for the second sensor, is effective to change the state of the corresponding operational amplifier stage, and in which each input circuit includes a second operational amplifier stage, said first and second operational amplifier stages of said one input circuit and said first and second operational amplifier stages of said another input circuit being contained in a single quad op amplifier integrated circuit chip.

24. The improvement set forth in claim 23 including timing means for imposing certain predetermined minimum time requirements on certain changes sensed by said sensors before such changes are allowed to occur at the output of said logic gate, said timing means being external of and operatively connected with said quad op amp integrated circuit chip in circuit relationship between the first and second operational amplifier stages of each of said one and said another input circuits.

25. In a day/night rearview mirror assembly having a mirrored surface in assocation with a voltage-controlled optical medium wherein the medium controls the brightness of the field of view reflected by the mirrored surface in accordance with voltage applied to the medium and a control circuit for selectively applying control voltage to the medium including a sensor for sensing incident light from the field of view to distinguish between a field of view which is bright and one which is dim and a second sensor for sensing general ambient light in the vicinity of the mirror assembly to distinguish between daytime conditions and nighttime conditions, the improvement which comprises said control circuit comprising means for operating said mirror assembly to two different stage of brightness, one higher and the other lower, comprising a logic gate having an output and plural inputs, means operatively coupling the logic gate output with the optical medium such that the logic gate output exercises control over the selective application of the control voltage to said medium to thereby selectively operate the mirror assembly to the two different states of brightness, plural input circuits each of which has an output connected to a corresponding one of the inputs of said logic gate, one of said input circuits containing the first-mentioned sensor and another of said input circuits containing the second sensors, operator controlled selectable switching means having plural inputs and an output, means operatively connecting the output of said logic gate to one of said operator controlled selected switching means inputs, means providing a higher brightness command signal, means providing a lower brightness command signal, means operatively connecting said means providing a higher brightness command signal to another input opf said operator controlled selectable switching means, means operatively connecting said means providing a lower brightness command signal to a further input of said operator controlled selectable switching means, said operator controlled selectable switching means being operable to selectively connect its input to its output.

* * * * *

UNITED STATES PATENT AND TRADEMARK OFFICE
CERTIFICATE OF CORRECTION

PATENT NO. : 4,701,022
DATED : October 20, 1987
INVENTOR(S) : Keith D. Jacob

It is certified that error appears in the above-identified patent and that said Letters Patent are hereby corrected as shown below:

At column 13, line 49, "passign" should read --passing--;

At column 13, line 60, "top" should read --to--;

At column 14, line 34, "indiating" should read --indicating--;

At column 15, line 16, "if" should read --is--;

At column 15, line 47, "indiative" should read --indicative--;

At column 16, line 4, "ligth" should read --light--;

At column 16, line 8, "stages" should read --states--;

At column 16, line 31, "coresponding" should read --corresponding--;

At column 17, line 16, "votlage" should read --voltage--;

At column 18, line 24, "stage" should read --states--;

At column 18, line 36, "sensors" should read --sensor--;

At column 18, line 39, "selected" should read --selectable--;

At column 18, line 44, "opf" should read --of--;

UNITED STATES PATENT AND TRADEMARK OFFICE
CERTIFICATE OF CORRECTION

PATENT NO. : 4,701,022
DATED : October 20, 1987
INVENTOR(S) : Keith D. Jacob

It is certified that error appears in the above-identified patent and that said Letters Patent is hereby corrected as shown below:

At column 18, line 50, "input" should read -- inputs --.

Signed and Sealed this

First Day of March, 1988

Attest:

DONALD J. QUIGG

*Attesting Officer*    *Commissioner of Patents and Trademarks*